(12) United States Patent
Warth et al.

(10) Patent No.: US 10,156,284 B2
(45) Date of Patent: Dec. 18, 2018

(54) MOTOR VEHICLE TRANSMISSION

(71) Applicant: ZF Friedrichshafen AG, Friedrichshafen (DE)

(72) Inventors: Viktor Warth, Friedrichshafen (DE); Stefan Beck, Eriskirch (DE); Michael Wechs, Weißensberg (DE); Christian Sibla, Eriskirch (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 133 days.

(21) Appl. No.: 15/500,621

(22) PCT Filed: Jul. 2, 2015

(86) PCT No.: PCT/EP2015/065057
§ 371 (c)(1),
(2) Date: Jan. 31, 2017

(87) PCT Pub. No.: WO2016/015945
PCT Pub. Date: Feb. 4, 2016

(65) Prior Publication Data
US 2017/0219062 A1 Aug. 3, 2017

(30) Foreign Application Priority Data

Aug. 1, 2014 (DE) .......... 10 2014 215 190

(51) Int. Cl.
*F16H 3/66* (2006.01)
*F16H 3/64* (2006.01)
*F16H 3/44* (2006.01)

(52) U.S. Cl.
CPC ............. *F16H 3/66* (2013.01); *F16H 3/64* (2013.01); *F16H 2003/442* (2013.01);
(Continued)

(58) Field of Classification Search
CPC ...... F16H 2200/2012; F16H 3/64; F16H 3/66; F16H 2200/201; F16H 2200/2046
See application file for complete search history.

(56) References Cited

U.S. PATENT DOCUMENTS 4,709,594 A 12/1987 Maeda
7,789,792 B2 9/2010 Kamm et al.
(Continued)

FOREIGN PATENT DOCUMENTS

DE 10 2005 002 337 A1 8/2006
DE 10 2008 019 419 A1 11/2008
(Continued)

OTHER PUBLICATIONS

German Search Report Corresponding to 10 2014 215 190.2 dated Feb. 26, 2015, (8 pages).
(Continued)

*Primary Examiner* — Mark J Beauchaine
(74) *Attorney, Agent, or Firm* — Davis & Bujold PLLC; Michael J. Bujold

(57) ABSTRACT

A vehicle transmission having a housing and a main transmission which includes input and output shafts and four planetary gearsets. Each of the gearsets has sun and ring gears, a carrier which supports a planetary gearwheel. The sun gear and the carrier of the second gearset are coupled permanently to the input and output shafts, respectively. The carrier of the second gearset is permanently coupled to the carrier of the fourth gearset. The ring gear of the second gearset is permanently coupled to the ring gear of the third gearset. The carrier of the fourth gearset can be coupled, via a first shifting element, to the sun gear of the second gearset. The carrier of the third gearset can be coupled, via a second shifting element, to the housing. The sun gear of the third gearset can be coupled, via third and fourth shifting elements, to the input shaft.

11 Claims, 11 Drawing Sheets

(52) U.S. Cl.
CPC ............... *F16H 2200/0065* (2013.01); *F16H 2200/0073* (2013.01); *F16H 2200/0078* (2013.01); *F16H 2200/201* (2013.01); *F16H 2200/2007* (2013.01); *F16H 2200/2012* (2013.01); *F16H 2200/2017* (2013.01); *F16H 2200/2038* (2013.01); *F16H 2200/2046* (2013.01); *F16H 2200/2053* (2013.01); *F16H 2200/2097* (2013.01)

(56) References Cited

U.S. PATENT DOCUMENTS

| | | |
|---|---|---|
| 8,801,563 B2 | 8/2014 | Ohnemus et al. |
| 9,353,833 B2 | 5/2016 | Beck et al. |
| 2009/0017976 A1* | 1/2009 | Phillips .................... F16H 3/66 475/276 |
| 2009/0197734 A1 | 8/2009 | Phillips et al. |

FOREIGN PATENT DOCUMENTS

| | | |
|---|---|---|
| DE | 10 2010 024 587 A1 | 12/2011 |
| DE | 10 2010 052 001 A1 | 5/2012 |
| DE | 10 2011 087 947 A1 | 6/2013 |
| DE | 10 2012 210 841 A1 | 1/2014 |

OTHER PUBLICATIONS

International Search Report Corresponding to PCT/EP2015/065057 dated Oct. 14, 2015, (5 pages).
Written Opinion Corresponding to PCT/EP2015/065057 dated Oct. 14, 2015, (10 pages).

* cited by examiner

| GEAR | CLOSED SHIFTING ELEMENTS | | | | | | GEAR RATIO i | GEAR INTERVAL φ |
|---|---|---|---|---|---|---|---|---|
| | B1 | B2 | K1 | K2 | K3 | K4 | | |
| V1 | X | | | | X | X | 6,42 | 1,47 |
| V2.1 | X | | | X | | X | 4,37 | 1,38 |
| V2.2 | X | X | | X | | | 4,37 | |
| V2.3 | X | | X | X | | | 4,37 | |
| V2.4 | X | | | X | X | | 4,37 | |
| V3 | X | X | | | | X | 3,16 | 1,34 |
| V4 | | X | | X | | X | 2,35 | |
| V5 | | X | | | X | X | 2,07 | 1,35 |
| V6 | | X | X | | | X | 1,74 | |
| V7 | | X | X | X | | | 1,45 | 1,30 |
| V8 | | X | X | | X | | 1,34 | |
| V9.1 | | | X | X | X | | 1,00 | 1,34 |
| V9.2 | | | X | | X | X | 1,00 | |
| V9.3 | | | | X | X | X | 1,00 | |
| V9.4 | | | X | X | | X | 1,00 | |
| R1 | X | | X | | | X | -15,30 | |
| Z1 | X | | X | | X | | 2,70 | |
| Z2 | | X | | X | X | | 1,67 | |

Fig. 2

| GEAR | CLOSED SHIFTING ELEMENTS |||||| GEAR RATIO i | GEAR INTERVAL φ |
|---|---|---|---|---|---|---|---|---|
| | B1 | B2 | K1 | K2 | K3 | K4 | | |
| V1 | X | | | | X | X | 9,36 | |
| V2.1 | X | | | X | | X | 5,83 | 1,61 |
| V2.2 | X | X | | X | | | 5,83 | |
| V2.3 | X | | X | X | | | 5,83 | 1,42 |
| V2.4 | X | | | X | X | | 5,83 | |
| V3 | X | X | | | | X | 4,10 | |
| V4 | | X | | X | | X | 2,87 | 1,43 |
| V5 | | X | | | X | X | 2,43 | 1,18 |
| V6 | | X | X | | | X | 1,84 | 1,32 |
| V7 | | X | X | X | | | 1,47 | 1,25 |
| V8 | | X | X | | X | | 1,35 | 1,09 |
| V9.1 | | | X | X | X | | 1,00 | |
| V9.2 | | | X | | X | X | 1,00 | 1,35 |
| V9.3 | | | | X | X | X | 1,00 | |
| V9.4 | | | X | X | | X | 1,00 | |
| R1 | X | | X | | | X | -5,60 | |
| Z1 | X | | X | | X | | 3,04 | |
| Z2 | | X | | X | X | | 1,83 | |

Fig. 3

| GEAR | | CLOSED SHIFTING ELEMENTS | | | | | | | | | GEAR RATIO i | GEAR INTERVAL φ |
|---|---|---|---|---|---|---|---|---|---|---|---|---|
| | | B1 | B2 | K1 | K2 | K3 | K4 | R | L | H | | |
| FORWARD | V1 | X | | | | X | X | | X | | 20.20 | |
| | V2 | X | | | X | | X | | X | | 13.76 | 1.47 |
| | V3 | X | X | | | | X | | X | | 9.95 | 1.38 |
| | V4 | | X | | X | | X | | X | | 7.39 | 1.35 |
| | V5 | | X | X | | | X | | X | | 5.49 | 1.35 |
| | V6 | | X | X | | X | | | X | | 4.21 | 1.30 |
| | V7.1 | | | X | X | X | | | X | | 3.15 | 1.34 |
| | V7.2 | | | | X | X | X | | X | | 3.15 | |
| | V8 | | X | | X | | X | | | X | 2.35 | 1.34 |
| | V9 | | X | X | | | X | | | X | 1.74 | 1.35 |
| | V10 | | X | X | | X | | | | X | 1.34 | 1.30 |
| | V11 | | | X | X | X | | | | X | 1.00 | 1.34 |
| REVERSE | R1 | X | | | | X | X | X | | | -41.84 | |
| | R2 | X | | | X | | X | X | | | -28.49 | 1.47 |
| | R3 | X | X | | | | X | X | | | -20.62 | 1.38 |
| | R4 | | X | | X | | X | X | | | -15.31 | 1.35 |
| | R5 | | X | X | | | X | X | | | -11.38 | 1.35 |
| | R6 | | X | X | | X | | X | | | -8.72 | 1.31 |
| | R7 | | | X | X | X | | X | | | -6.52 | 1.34 |

Fig. 5

MOTOR VEHICLE TRANSMISSION

This application is a National Stage completion of PCT/EP2015/065057 filed Jul. 2, 2015, which claims priority from German patent application serial no. 10 2014 215 190.2 filed Aug. 1, 2014.

FIELD OF THE INVENTION

The invention concerns a motor vehicle transmission.

BACKGROUND OF THE INVENTION

In commercial vehicles, for example trucks, the transmissions used are most often manually shifted transmissions or automated manually shifted transmissions. Manually shifted and automated manually shifted transmissions are noted for high efficiency along with low purchase costs. In such manually shifted and automated manually shifted transmissions, shifting operations take place with traction force interruption.

In passenger cars the transmissions used are more and more often dual clutch transmissions. In dual clutch transmissions shifts can be carried out without traction force interruption. However, dual clutch transmissions are characterized by larger dimensions, higher weight and higher purchase costs. Furthermore, for use in commercial vehicles, in which the dual clutch transmission should then be designed as a so-termed group transmission, dual clutch transmissions are not always suitable. One of the reasons for this is that with a dual clutch transmission geometrical gear steps, particularly in the lower gears, lead to gear intervals that are too small so that a large number of shifts have to be carried out. By virtue of the system, skipping individual gears is not possible in a dual clutch transmission.

From DE 10 2011 087 947 A1 a motor vehicle transmission designed as a group transmission with a main transmission and a downstream group connected downstream from the main transmission is known, wherein planetary gearsets or planetary gear stages are used in both the main transmission and the downstream group of the group transmission.

From DE 10 2005 002 337 A1 a further motor vehicle transmission is known, which uses a plurality of planetary gearsets or planetary gear stages.

SUMMARY OF THE INVENTION

Starting from there, the purpose of the present invention is to provide a new form of motor vehicle transmission.

This objective is achieved by a motor vehicle transmission as described below. The transmission according to the invention comprises a housing and a main transmission. The main transmission has at least one shaft on the drive input side and at least one shaft on the drive output side; it has a first planetary gearset with a sun gear, a carrier, a planetary gearwheel mounted on the carrier and a ring gear; it also has a second planetary gearset with a carrier permanently coupled to the shaft on the drive output side, a planetary gearwheel mounted on the carrier and a ring gear; it also has a third planetary gearset with a sun gear, a carrier, a planetary gearwheel mounted on the carrier and a ring gear; and it also has a fourth planetary gearset with a sun gear, a carrier, a planetary gearwheel mounted on the carrier and a ring gear; wherein the carrier of the second planetary gearset is permanently coupled to the carrier of the fourth planetary gearset; wherein the ring gear of the second planetary gearset is permanently coupled to the ring gear of the third planetary gearset; wherein the carrier of the fourth planetary gearset, by means of an interposed first shifting element, can be coupled to the sun gear of the third planetary gearset; wherein the carrier of the third planetary gearset, by means of an interposed second shifting element, can be coupled to the housing; and wherein the sun gear of the third planetary gearset, by means of interposed third and fourth shifting elements, can be coupled to shaft on the drive input side.

With this main transmission nine forward gears and one reversing gear can be obtained. Two of the nine forward gears can be produced by different shift combinations. Moreover, if necessary two additional gears can be used.

The main transmission has a compact structure and high efficiency. A large number of gears with almost geometrical gear steps can be obtained.

The motor vehicle transmission according to the invention comprises only a small number of planetary gear stages or planetary gearsets and shifting elements. For each gear only a small number of shifting elements are opened.

According to an advantageous further development, the motor vehicle transmission comprises a fifth shifting element and a sixth shifting element, such that the fifth shifting element is connected either between the carrier of the third planetary gearset and the ring gear of the fourth planetary gearset, or between the sun gear of the fourth planetary gearset and on the one hand the fourth shifting element and on the other hand the third shifting element, and such that the sixth shifting element is connected either between the sun gear of the first planetary gearset and the housing, or between the carrier of the first planetary gearset and the carrier of the third planetary gearset, or between the ring gear of the first planetary gearset and the fourth shifting element and, further, the third shifting element. This further development is preferred for providing nine forward gears and one reversing gear with four planetary gearsets and six shifting elements. For each gear three shifting elements are opened.

Preferably, the first planetary gearset is positioned close to a drive-input-side end of the main transmission; whereas the second planetary gearset is positioned close to a drive-output-side of the main transmission; whereas the third planetary gearset is positioned between the first planetary gearset and the second planetary gearset close to the first planetary gearset; and whereas the fourth planetary gearset is positioned between the first planetary gearset and the second planetary gearset close to the second planetary gearset. This gives a particularly compact form of the motor vehicle transmission.

Preferably, the second and third shifting elements of the main transmission are interlock-type shifting elements, whereas the other shifting elements of the main transmission are frictional shifting elements. If the second and third shifting elements are interlocking shifting elements drag torques can be reduced. This increases the efficiency of the transmission.

According to an advantageous further development, the drive-output-side shaft of the main transmission engages with a drive-input-side shaft of the downstream transmission connected downstream from the main transmission; the downstream transmission comprises a fifth planetary gearset with a sun gear, a carrier, a planetary gearwheel mounted on the carrier and a ring gear, and also a sixth planetary gearset with a sun gear, a carrier, a planetary gearwheel mounted on the carrier and a ring gear.

Such a group transmission, which comprises the main transmission and the downstream group, is particularly suitable for use in trucks. With such a transmission up to eighteen forward gears and nine reversing gears can be produced. To obtain suitable gear intervals, preferably seven gears are used in the so-termed 'Low' driving range of the downstream transmission and four gears in the so-termed 'High' driving range, so that then eleven forward gears and seven reversing gears are obtained.

Preferably, the sun gear of the fifth planetary gearset is permanently coupled to the drive-input-side shaft of the downstream transmission and thus also to the drive-output-side shaft of the main transmission; whereas the carrier of the sixth planetary gearset is permanently coupled to a drive-output-side shaft of the downstream transmission; whereas the ring gear of the fifth planetary gearset is permanently coupled to the sun gear of the sixth planetary gearset; and whereas the carrier of the fifth planetary gearset is permanently coupled to the ring gear of the sixth planetary gearset. This is particularly advantageous for the production of the group transmission.

BRIEF DESCRIPTION OF THE DRAWINGS

Preferred further developments emerge from the subordinate claims and from the description given below. Example embodiments of the invention, to which it is not limited, will be explained in more detail with reference to the drawings, which show:

FIG. 2: A shift matrix for the motor vehicle transmission according to FIG. 1;

FIG. 3: A further shift matrix for the motor vehicle transmission according to FIG. 1;

FIG. 5: A shift matrix for the motor vehicle transmission according to FIG. 4;

DETAILED DESCRIPTION OF THE DRAWINGS

The present invention concerns a motor vehicle transmission.

Figure 1:
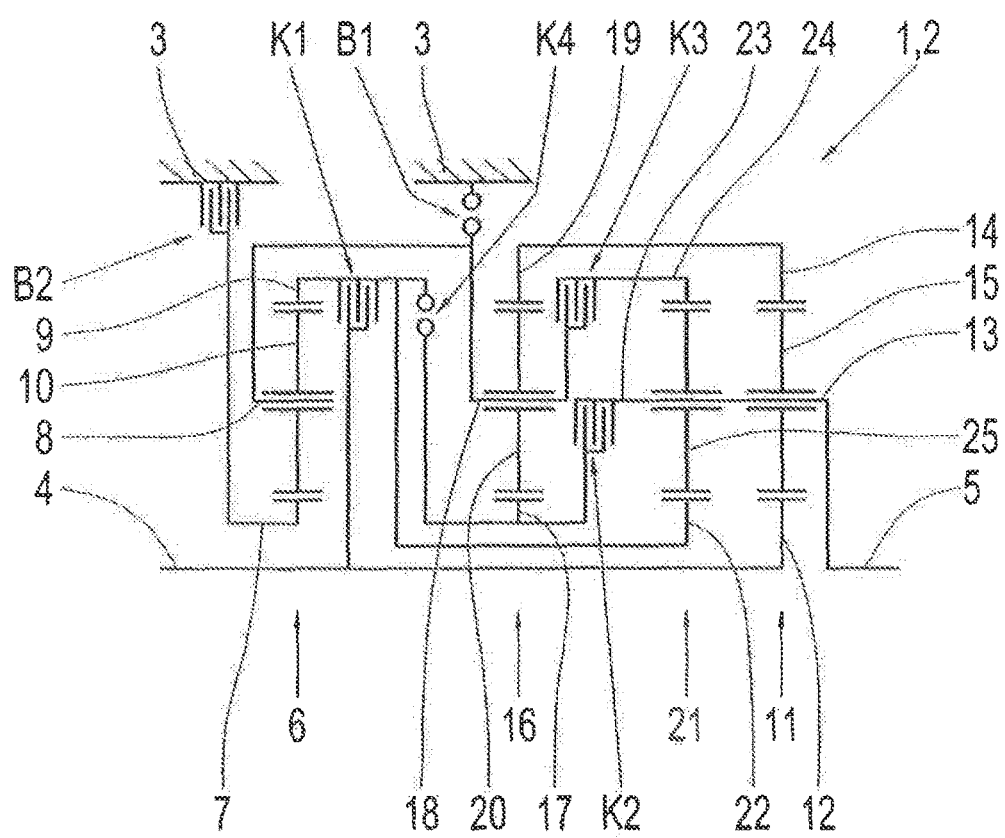
FIG. 1: A diagram representing a first motor vehicle transmission according to the invention.

FIG. 1 shows a first example embodiment of a motor vehicle transmission 1 according to the invention. The transmission 1 in FIG. 1 comprises a main transmission 2 and a housing 3.

The main transmission 2 comprises a shaft 4 on the drive input side, a shaft 5 on the drive output side, a plurality of planetary gear stages 6, 11, 16 and 21, also called planetary gearsets, and a plurality of shifting elements B1, B2, K1, K2, K3 and K4.

A first planetary gear stage or planetary gearset 6 of the main transmission 2 has a sun gear 7, a carrier 8, a planetary gearwheel 10 mounted on the carrier 8, and a ring gear 9. A second planetary gear stage or planetary gearset 11 of the main transmission 2 also has a sun gear 12, a carrier 13, a planetary gearwheel 15 mounted on the carrier 13, and a ring gear 14. The sun gear 12 of the second planetary gear stage 11 is permanently coupled to the drive-input-side shaft 4. The carrier 13 of the second planetary gear stage 11 is permanently coupled to the drive-output-side shaft 5.

In addition to the first planetary gear stage 6 and the second planetary gear stage 11, the main transmission 2 of the motor vehicle transmission 1 also has a third planetary gear stage 16 or third planetary gearset with a sun gear 17, a carrier 18, a planetary gearwheel 20 mounted on the carrier 18, and a ring gear 19, as well as a fourth planetary gear stage 21 or fourth planetary gearset with a sun gear 22, a carrier 23, a planetary gearwheel 25 mounted on the carrier 23, and a ring gear 24.

The carrier 13 of the second planetary gear stage 11 of the main transmission 2, which is permanently coupled to the shaft 5 on the drive output side, is also permanently coupled to the carrier 23 of the fourth planetary gear stage 21.

The ring gear 14 of the second planetary gear stage 11 of the main transmission 2 is permanently coupled to the ring gear 19 of the third planetary gear stage 16.

By interposing a first shifting element K2, the carrier 23 of the fourth planetary gear stage 21 of the main transmission 2 can be coupled to the sun gear 17 of the third planetary gear stage 16, namely in such manner that when the first shifting element K2 is closed, the carrier 23 of the fourth planetary gear stage 21 is coupled to the sun gear 17 of the third planetary gear stage 16, whereas in contrast, when the first shifting element K2 is open the carrier 23 of the fourth planetary gear stage 21 is decoupled from the sun gear 17 of the third planetary gear stage 16.

The carrier 18 of the third planetary gear stage 16 of the main transmission 2 can be coupled to the housing 3 by interposing a second shifting element B1.

When the second shifting element B1 is closed the carrier 18 is connected fast to the housing 3, whereas in contrast, when the second shifting element 31 is open, the carrier 18 of the third planetary gear stage 16 is decoupled from the housing 3 of the transmission 1.

The sun gear 17 of the third planetary gear stage 16 of the main transmission 2 is coupled to the drive-input-side shaft 4 by interposing a third shifting element K4 and a fourth shifting element K1.

When these two shifting elements K1 and K4 are both closed, the sun gear 17 of the third planetary gear stage 16 is coupled fast to the drive-input-side shaft 4, whereas in contrast, when one or both of these two shifting elements K1 and K4 is/are open, the sun gear 17 of the third planetary gear stage 16 is decoupled from the drive-input-side shaft 4 of the main transmission 2.

In addition to the above-mentioned four shifting elements K2, B1, K4 and K1, the main transmission 2 of the motor vehicle transmission 1 shown in FIG. 1 comprises two further shifting elements, namely a fifth shifting element K3 and a sixth shifting element B2.

In the example embodiment of FIG. 1 the fifth shifting element K3 is connected between the carrier 18 of the third planetary gear stage 16 and the ring gear 24 of the fourth planetary gear stage 21, namely in such manner that when this fifth shifting element K3 is closed, the carrier 18 of the third planetary gear stage 16 is coupled to the ring gear 24 of the fourth planetary gear stage 21, whereas in contrast, when the fifth shifting element K3 is open, the carrier 18 of the third planetary gear stage 16 is decoupled from the ring gear 24 of the fourth planetary gear stage 21.

In this case the sun gear 22 of the fourth planetary gear stage 21 of the main transmission 2 can be coupled, exclusively by interposing the fourth shifting element K1, to the drive-input-side shaft 4, and exclusively by interposing the third shifting element K4, to the sun gear 17 of the third planetary gear stage 16, whereby in addition the ring gear 9 of the first planetary gear stage 6 is coupled fast to the sun gear 22 of the fourth planetary gear stage 21.

In the example embodiment of FIG. 1, the sixth shifting element B2 is connected between the sun gear 7 of the first planetary gear stage 6 and the housing 3, namely in such manner that when the sixth shifting element B2 is closed, the sun gear 7 of the first planetary gear stage 6 is connected fast to the housing 3 of the motor vehicle transmission 1, whereas when the sixth shifting element B2 is open, the sun gear 7 of the first planetary gear stage 6 is decoupled from the housing 3 of the motor vehicle transmission 1.

In this case the carrier 8 of the first planetary gear stage 6 of the main transmission 2 is permanently coupled to the carrier 18 of the third planetary gear stage 16, and further, the ring gear 9 of the first planetary gear stage 6 can be coupled by exclusive interposition of the fourth shifting element K1 to the drive-input-side shaft 4 and by exclusive interposition of the third shifting element K4 to the sun gear 17 of the third planetary gear stage 16.

With the main transmission 2 shown in FIG. 1, using the four planetary gear stages 6, 11, 16 and 21 and the six shifting elements B1, B2, K1, K2, K3 and K4 nine forward gears and one reversing gear can be obtained. In each gear three shifting elements are open and three shifting elements are closed. The drive input and the drive output are preferably positioned coaxially, although the drive output can also be arranged laterally.

The second shifting element B1 and the third shifting element K4 of the main transmission 2 are preferably interlock-type shifting elements, whereas in contrast the rest of the shifting elements B2, K1, K2 and K3 of the main transmission 2 are preferably frictional shifting elements. By using interlocking shifting elements for shifting elements B1 and K4 drag torques can be reduced, whereby the efficiency can be increased.

As the starting element for the motor vehicle group transmission 1 a hydrodynamic torque converter, a hydrodynamic clutch, an additional starting clutch, an integrated starting clutch or an additional electric machine can be used.

Basically, an electric machine can be fitted on any shaft of the motor vehicle group transmission 1.

On each shaft of the motor vehicle group transmission 1, a freewheel can, in principle, be arranged on the housing or on another shaft of the motor vehicle group transmission 1.

The first planetary gear stage 6 of the main transmission 2 is preferably positioned close to a drive-input-side end of the main transmission 2 and the second planetary gear stage 11 of the main transmission 2 preferably close to a drive-output-side end of the main transmission 2. The third planetary gear stage 16 and the fourth planetary gear stage 21 of the main transmission 2 are positioned between the first planetary gear stage 6 and the second planetary gear stage 11, preferably in such manner that the third planetary gear stage 16 is close to the first planetary gear stage 6 and the fourth planetary gear stage is close to the second planetary gear stage 11.

The main transmission 2 shown in FIG. 1 can use the shift matrix shown in FIG. 2. According to that, nine forward gears V1 to V9, one reversing gear R1, and two additional gears Z1 and Z2 can be obtained or used. Shifting elements which are closed in the respective gears are identified with an X in the shift matrix of FIG. 2. The forward gears V2 and V9 can be obtained with four different shift combinations.

The gear ratios i and gear intervals Φ shown in FIG. 2 are obtained when the stationary gear ratio of the first planetary gear stage 6 is chosen as i0=−1.500, that of the second planetary gear stage 11 is chosen as i0=−2.160, that of the third planetary gear stage 16 as i0=−1.790 and the stationary gear ratio of the fourth planetary gear stage 21 is chosen as i0=−1.700.

The transmission of FIG. 1 and the shift matrix of FIG. 2 are suitable, for example, for use as the motor vehicle transmission 1 in a bus.

The transmission 1 of FIG. 1 can also be used in passenger cars, preferably using the shift matrix of FIG. 3, wherein the transmission ratios i and the gear intervals φ in the shift matrix of FIG. 3 are obtained when the stationary gear ratio of the first planetary gear stage 6 is chosen as i0=−1.590, that of the second planetary gear stage 11 is chosen as i0=−3.100, that of the third planetary gear stage 16 as i0=−1.790 and the stationary gear ratio of the fourth planetary gear stage 21 is chosen as i0=−2.040.

In a preferred further development of the invention, the main transmission 2 of FIG. 1 is extended by using a downstream transmission 26 in driving connection downstream from the main transmission 2 to produce a group transmission.

Figure 4:
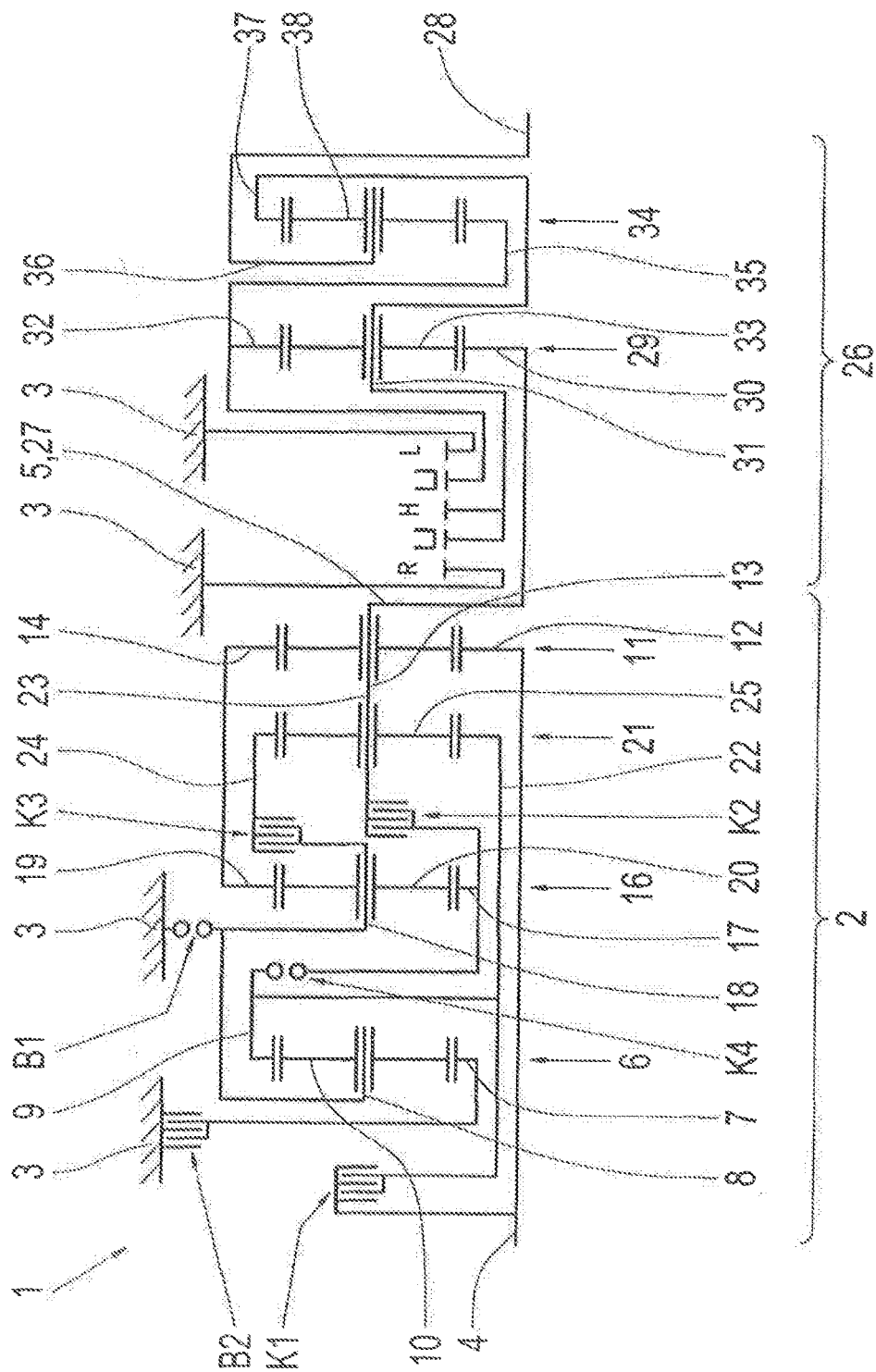
FIG. 4: A diagram representing a second motor vehicle transmission according to the invention.

FIG. 4 shows a first variant of such a group transmission consisting of the main transmission 2 of FIG. 1 and a downstream transmission 26 in driving connection downstream from the main transmission 2, such that to the drive-output-side shaft 5 of the main transmission 2, a drive-input-side shaft 27 of the downstream transmission 26 connected downstream from the main transmission 2 is permanently coupled.

The downstream transmission 26 has two planetary gear stages or planetary gearsets 29 and 34, namely a fifth planetary gear stage 29 with a sun gear 30, a carrier 31, a planetary gearwheel 33 mounted on the carrier 31 and a ring gear 32, as well as a sixth planetary gear stage 34 with a sun gear 35, a carrier 36, a planetary gearwheel 38 mounted on the carrier 36 and a ring gear 37.

The sun gear 30 of the fifth planetary gear stage 29 is permanently coupled to the drive-input-side shaft 27 of the downstream transmission 26 and thus also to the drive-output-side shaft 5 of the main transmission 2. The carrier 36 of the sixth planetary gear stage 34 is permanently coupled to a drive-output-side shaft 28 of the downstream transmission 26. The ring gear 32 of the fifth planetary gear stage 29 is permanently coupled to the sun gear 35 of the sixth planetary gear stage 34. The carrier 31 of the fifth planetary gear stage 29 is permanently coupled to the ring gear 37 of the sixth planetary gear stage 34.

In addition to the two planetary gear stages 29 and 34, the downstream transmission 26 comprises three shifting elements R, H, L, all of them being interlock-type shifting elements.

In the example embodiment of FIG. 4 these shifting elements R, H, L cooperate with the carrier 31 and the ring gear 32 of the fifth planetary gear stage 29 in such manner that depending on the shifting position of these shifting elements R, H and L, the carrier 31 of the fifth planetary gear stage 29 and the ring gear 32 of the fifth planetary gear stage 29 are coupled either to the housing 3 or to one another. To obtain the so-termed 'Low' driving range of the downstream transmission 26, the interlocking shifting element L is closed so that then the ring gear 32 of the fifth planetary gear stage 29 is connected to the housing 3. To obtain the so-termed 'High' driving range, the shifting element H is closed so that then the ring gear 32 of the fifth planetary gear stage 29 is coupled to the carrier 31 thereof. When, for the provision of reverse driving gears, the shifting element R is closed, the carrier 31 of the fifth planetary gear stage 29 is coupled to the housing 3.

Accordingly, the downstream transmission 26 of FIG. 4 has two planetary gear stages 29 and 34 as well as three interlocking shifting elements R, H and L, and serves to provide two forward gears and one reversing gear.

With the motor vehicle group transmission 1 of FIG. 4 the shift matrix of FIG. 5 can be used, wherein the transmission ratios i and gear intervals shown are obtained when the stationary gear ratio of the first planetary gear stage 6 of the main transmission 2 is chosen as i0=−1.500, that of the second planetary gear stage 11 of the main transmission 2 is chosen as i0=−2.160, that of the third planetary gear stage 16 as i0=−1.790 and the stationary gear ratio of the fourth planetary gear stage 21 of the main transmission 2 is chosen as i0=−1.700, while that of the fifth planetary gear stage 29 in the downstream transmission 26 is chosen as i0=−1.450 and that of the sixth planetary gear stage 34 in the downstream transmission 26 is chosen as i0=−3.500.

Basically, with the group transmission of FIG. 4 eighteen forward gears and nine reversing gears can be obtained.

To produce suitable gear intervals in a group transmission, in the Low driving range seven gears, and in the High driving range four gears are used, so that a total of eleven forward gears V1 to V11 and seven reversing gears R1 to R7 are used.

Figure 6:
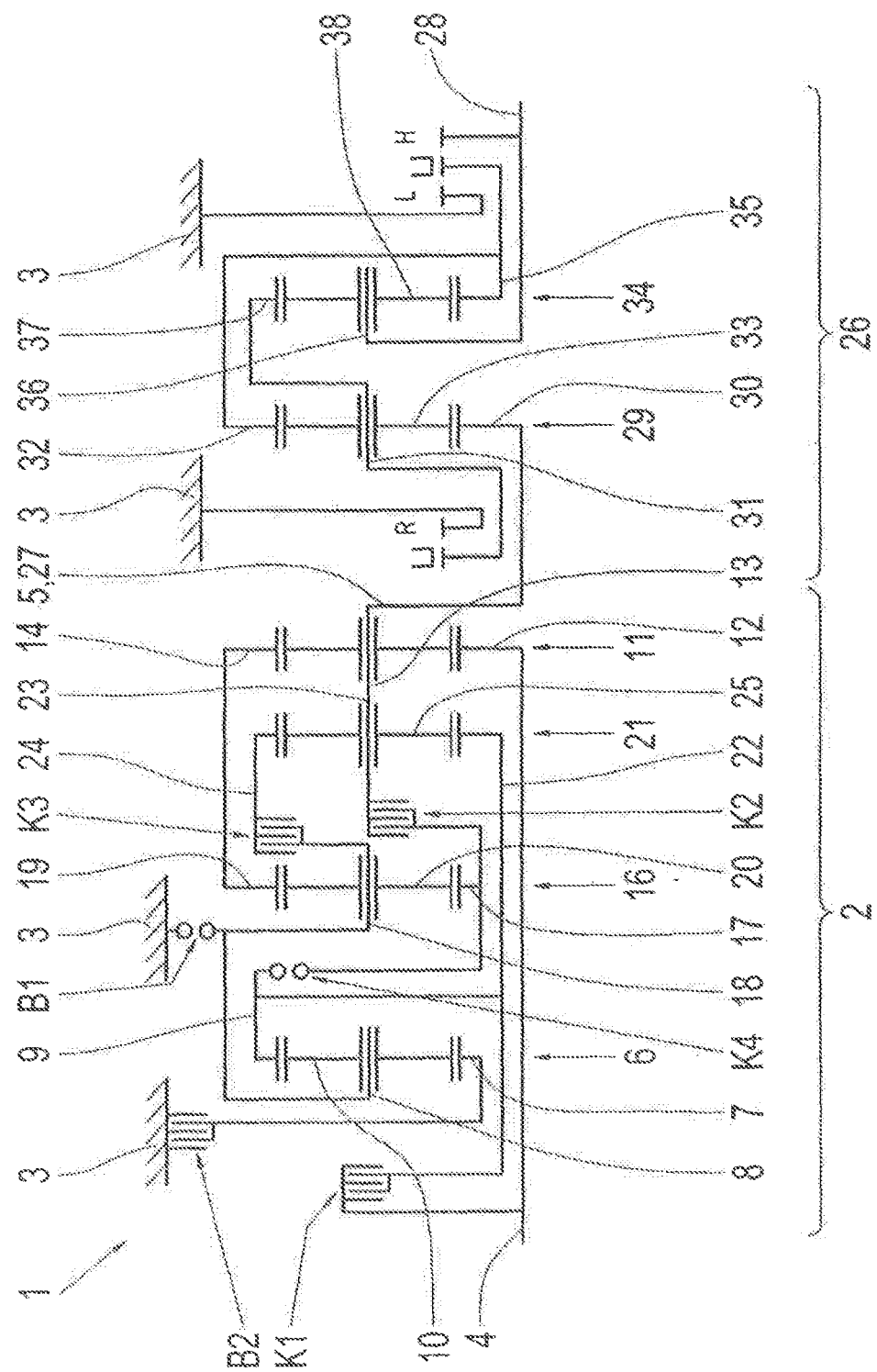
FIG. 6: A diagram representing a third motor vehicle transmission according to the invention.

FIG. 6 shows a modification of the group transmission according to FIG. 4, which differs from the group transmission of FIG. 4 in the interconnection of the shifting elements R, L and H with the two planetary gearsets 29 and 34 of the downstream group 26.

Thus, the shifting element R, which is closed in order to produce the reversing gears and in the closed condition couples the carrier 31 of the fifth planetary gear stage 29 to the housing 3 of the transmission 1, cooperates with the fifth planetary gearset 29. In FIG. 6 the shifting elements L and H cooperate with the sixth planetary gear stage 34, namely in such manner that to obtain the Low driving range the shifting element L is closed and then connects the sun gear 35 of the sixth planetary gear stage 34 to the housing 3, whereas to obtain the High driving range the shifting element H is closed and the carrier 36 of the sixth planetary gear stage 34 is then coupled to the sun gear 35.

In FIGS. 4 and 6 the two planetary gearsets 29 and 34 of the downstream group 26 are positioned axially one behind the other. In the example embodiment of FIG. 7 the two planetary gear stages 29 and 34 are nested radially, so that then the ring gear 32 of the fifth planetary gear stage 29 and the sun gear 35 of the sixth planetary gear stage 34 consist of one and the same assembly.

Figure 7:
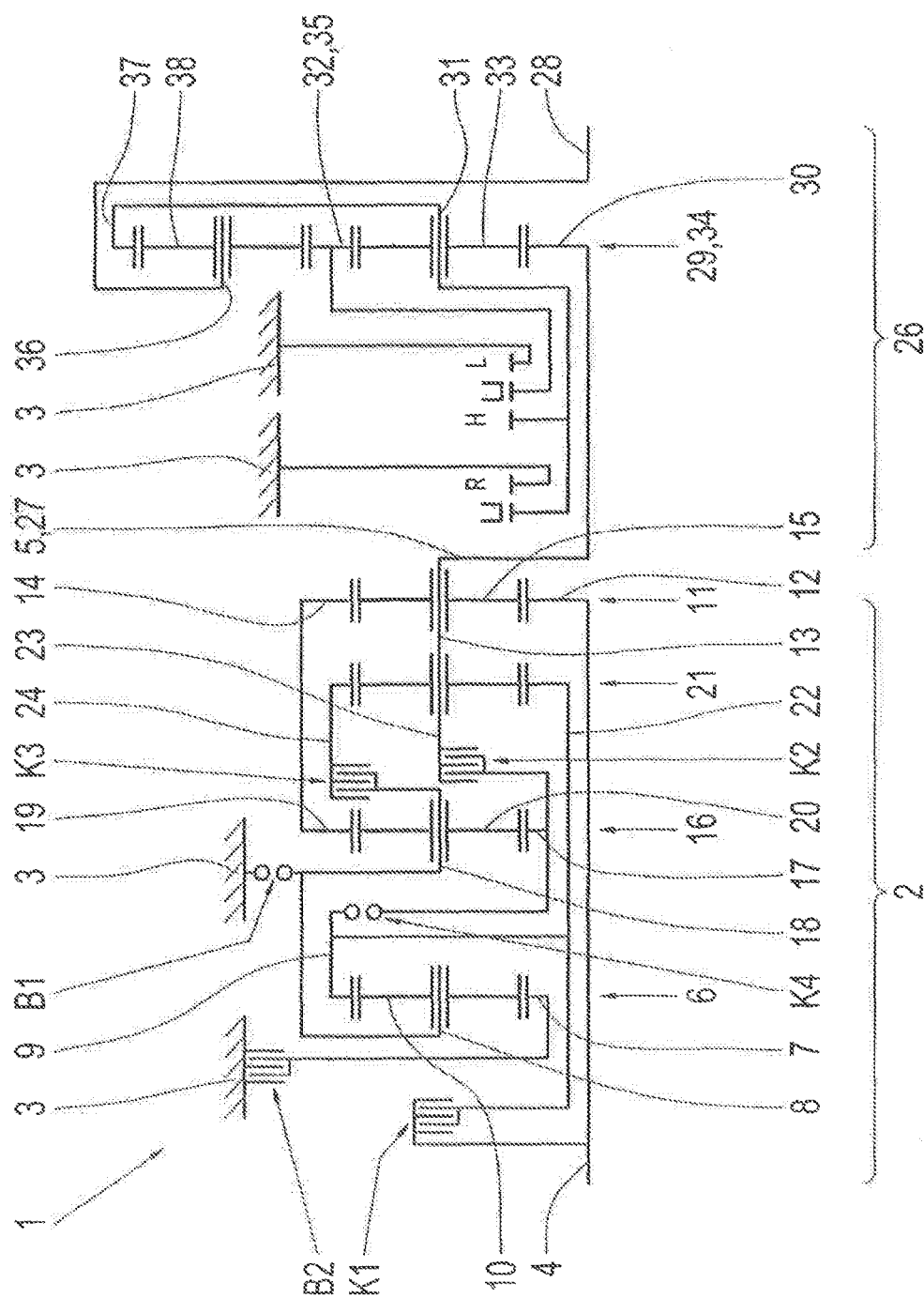
FIG. 7: A diagram representing a fourth motor vehicle transmission according to the invention.
Figure 8:
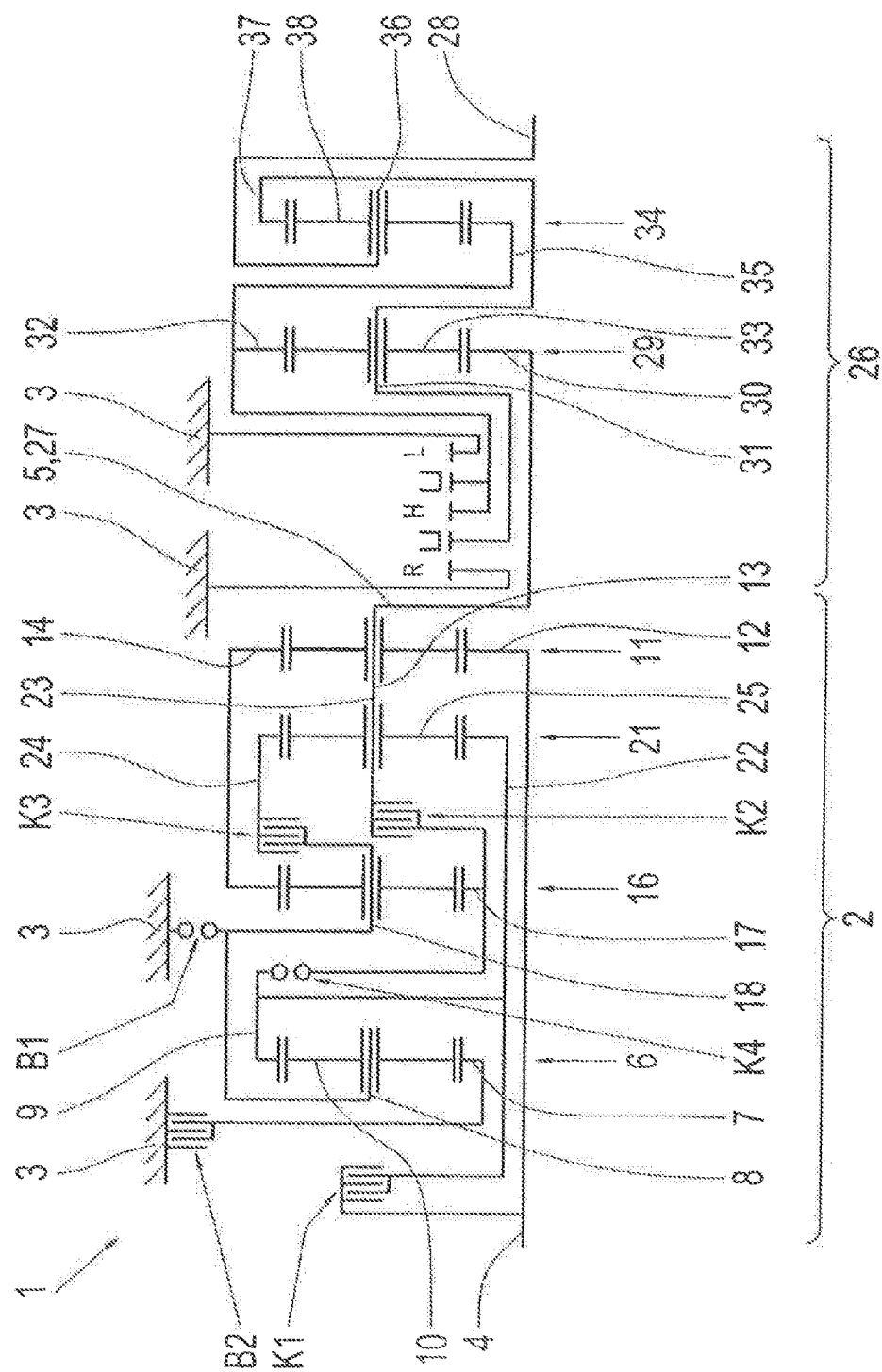
FIG. 8: A diagram representing a fifth motor vehicle transmission according to the invention.

Of the three interlocking shifting elements R, H and L, any two of them can be combined in a dual shifting element. For example the shifting elements H and L can be combined in a dual shifting element, as shown in FIGS. 4, 6 and 7. Furthermore, as can be seen in FIG. 8 the two shifting elements R and H can be combined in a dual shifting element. Moreover, the shifting elements R and L can be combined in a dual shifting element.

Figure 9:
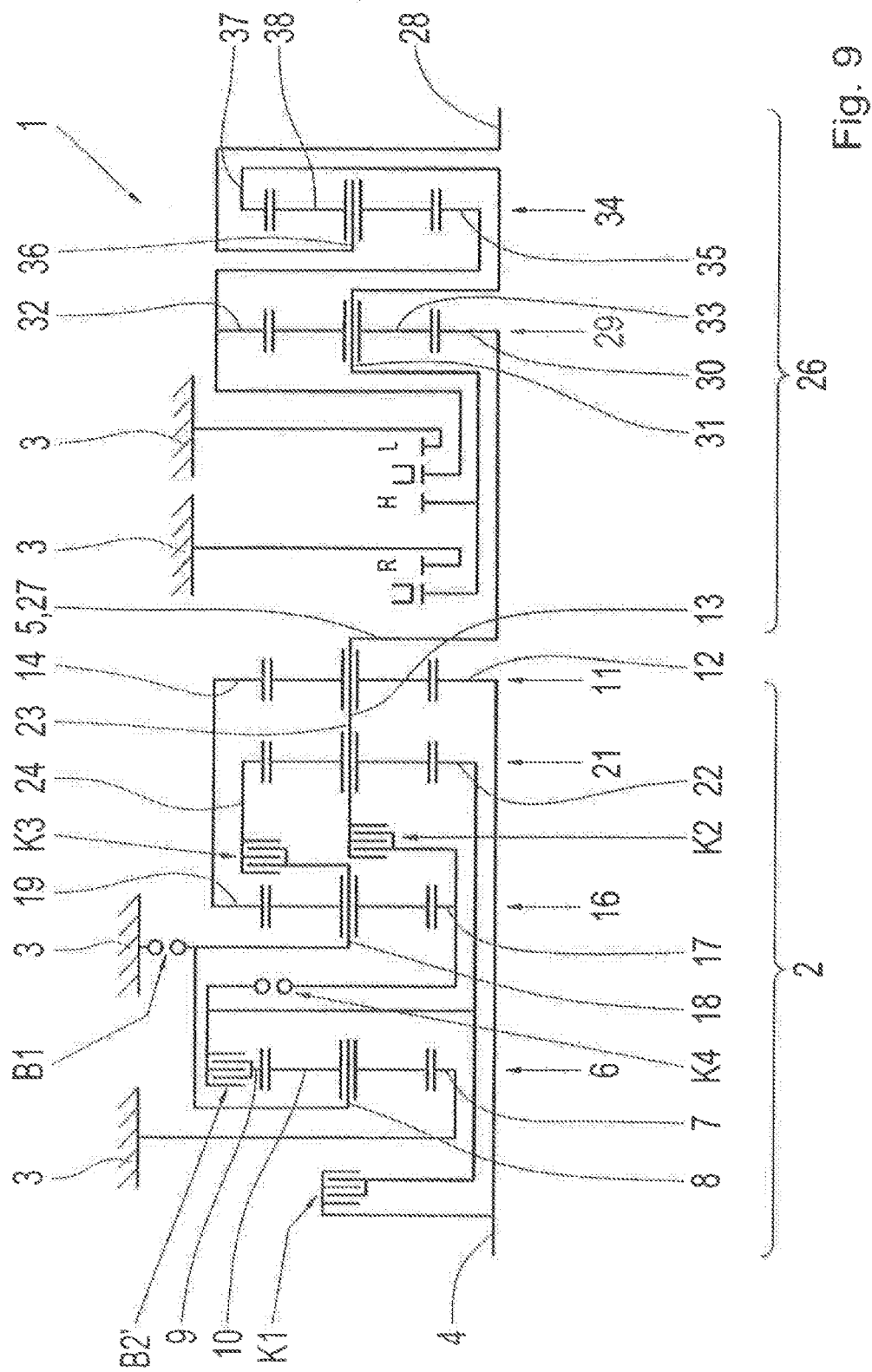
FIG. 9: A diagram representing a sixth motor vehicle transmission according to the invention.
Figure 10:
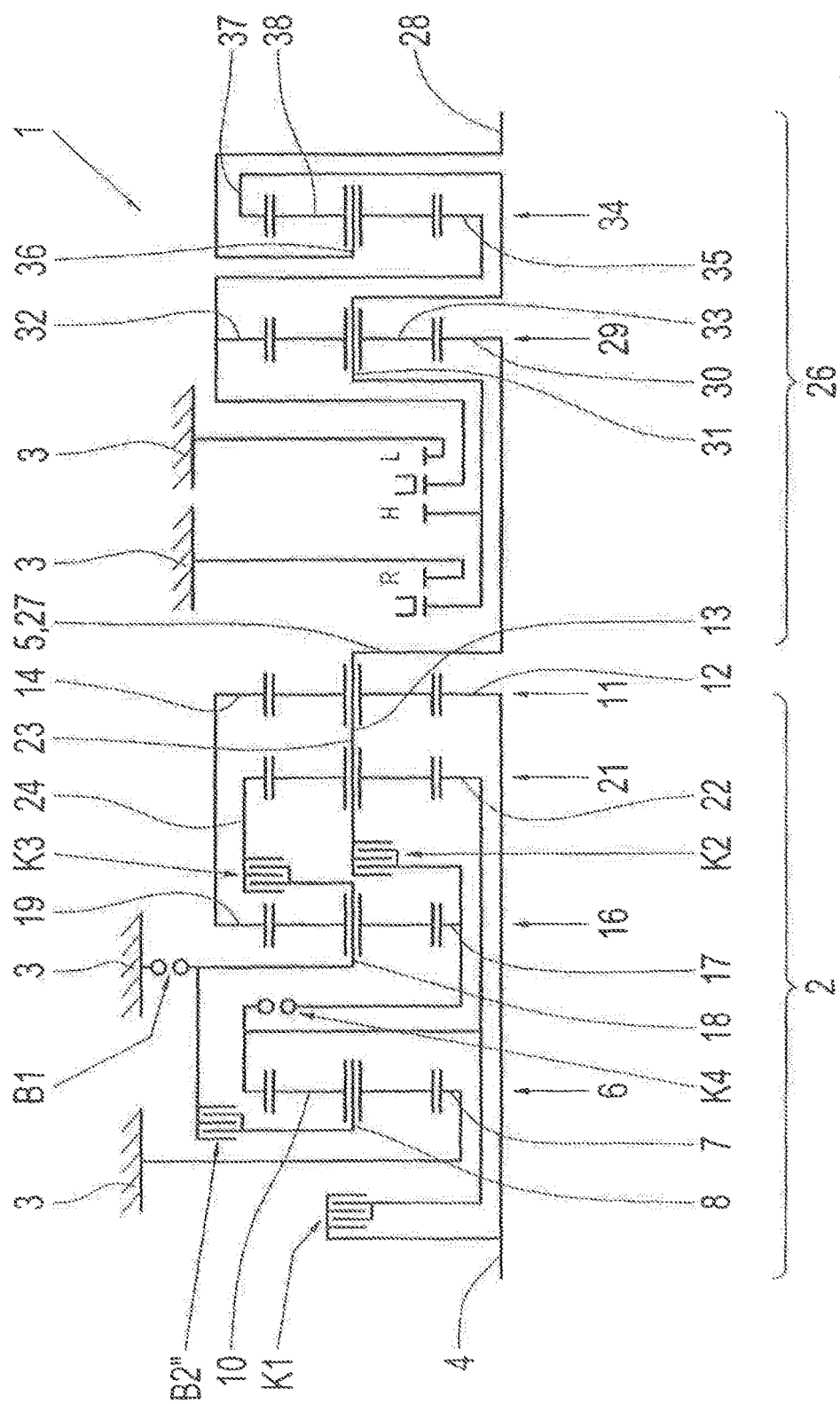
FIG. 10: A diagram representing a seventh motor vehicle transmission according to the invention.
Figure 11:
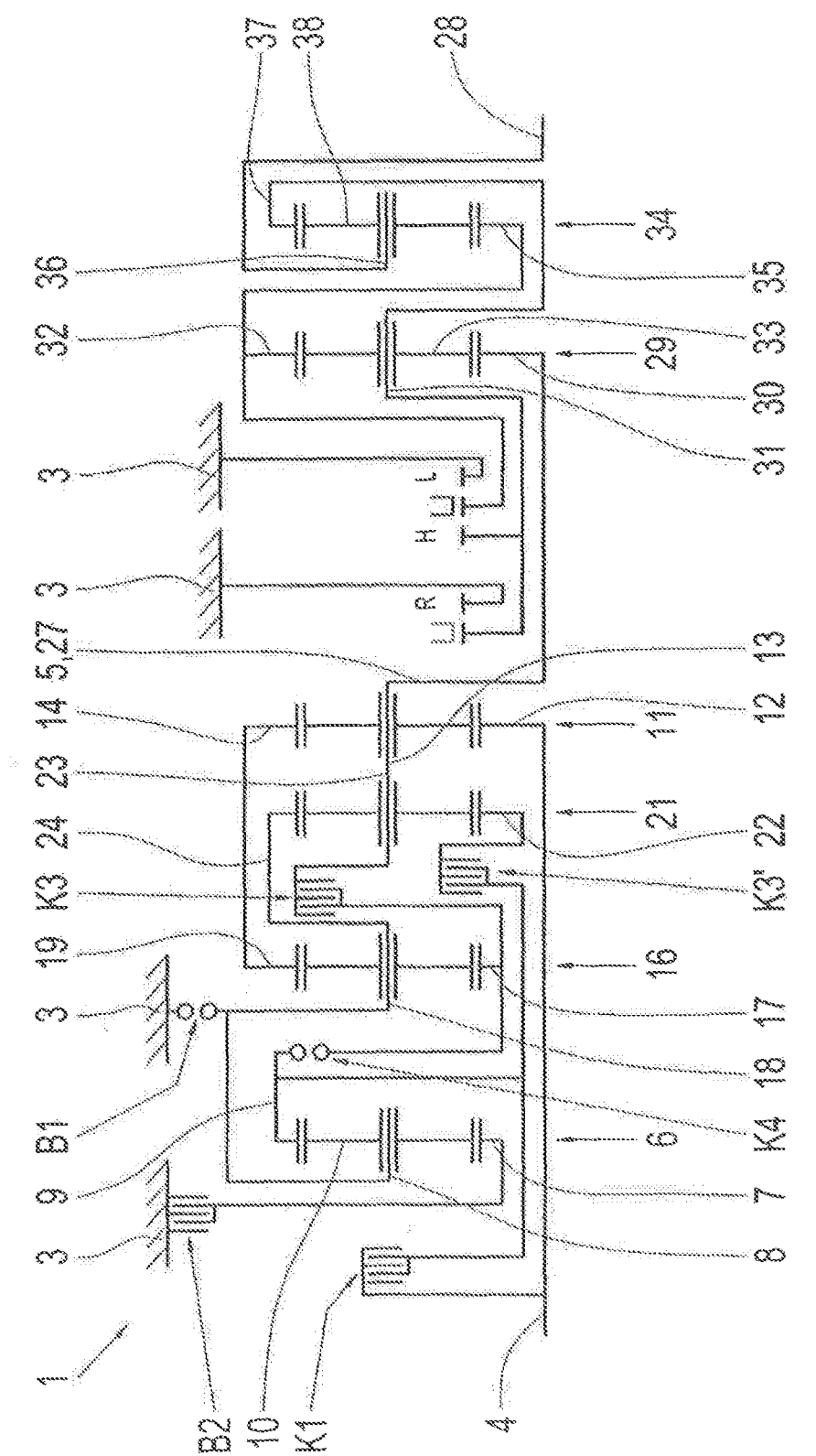
FIG. 11: A diagram representing a further motor vehicle transmission according to the invention.

Further variants of transmissions according to the invention, all of which are designed as group transmissions with a main transmission 2 and a downstream transmission 26, are shown in FIGS. 9, 10 and 11, such that the example embodiments of FIGS. 9, 10 and 11 differ from the example embodiments already described essentially in the arrangement and coupling of the shifting elements B2 and K3 to the planetary gear stages of the main transmission 2.

In the embodiment variant shown in FIG. 9 the element B2, which in FIG. 9 is indexed B2', is connected between the ring gear 9 of the first planetary gear stage 6 and the fourth shifting element K1, and further, between the ring gear 9 of the first planetary gear stage 6 and the third shifting element K4.

In the embodiment variant of FIG. 9 the carrier 8 of the first planetary gear stage 6 is then permanently coupled to the carrier 18 of the third planetary gear stage 16, and further, in this case the sun gear 7 of the first planetary gear stage 6 is permanently coupled to the housing 3.

Another variant of a group transmission 1 is shown in FIG. 10, in which the sixth shifting element B2" is connected between the carrier 8 of the first planetary gear stage 6 and the carrier 18 of the third planetary gear stage 16.

In the embodiment variant of FIG. 10 the ring gear 9 of the first planetary gear stage 6 is coupled, with interposition exclusively of the fourth shifting element K1, to the drive-input-side shaft 4, and with interposition exclusively of the third shifting element K4, to the sun gear 17 of the third planetary gear stage 16, so that the sun gear 7 of the first planetary gear stage 6 is coupled permanently to the housing 3.

FIG. 11 shows a further variant of a group transmission 1, such that in FIG. 11 the fifth shifting element K3, which is indexed K3', is connected between the sun gear 22 of the fourth planetary gear stage 21 and the fourth shifting element K1 and the third shifting element K4, so that then the carrier 18 of the third planetary gear stage 16 and the ring gear 24 of the fourth planetary gear stage 21 are permanently coupled.

The shifting elements B2 and K3 can therefore be placed in different positions within the main transmission 2 with equal effect. These shifting elements B2 and K3 act on one side of the shifting element in each case only on a gearset element of one planetary gearset. By virtue of the different arrangements of the shifting elements B2 or B2' or B2" and K3 or K3' shown in FIGS. 9 to 11, the force flow or torque flow in the transmission is unchanged.

The positional variation of the shifting elements B2 and K3 in the main transmission 2 according to FIGS. 9 and 10 can of course be combined with the variation of the downstream transmission 26 shown in FIGS. 4, 6, 7 and 8.

The transmissions according to the invention are characterized by high efficiency and little assembly effort and expense. The transmissions have a compact structure. In the starting range progressive gear intervals, and in the higher gears almost geometric gear intervals can be produced. For the group transmissions a plurality of reversing gears can be obtained. There is a large number of powershiftable gears. Component loads can be kept low. The lower gears have good multiple shiftability.

When both of the shifting elements L and R of the downstream transmission 26 are closed, a parking lock function can be realized.

Instead of minus planetary gearsets, plus planetary gearsets can also be used, namely when the ring gear and carrier connections are swapped and the value of the stationary transmission ratio is increased by 1.

INDEXES

1 Motor vehicle transmission
2 Main transmission

3 Housing
4 Shaft
5 Shaft
6 Planetary gear stage/planetary gearset
7 Sun gear
8 Carrier
9 Ring gear
10 Planetary gearwheel
11 Planetary gear stage/planetary gearset
12 Sun gear
13 Carrier
14 Ring gear
15 Planetary gearwheel
16 Planetary gear stage/planetary gearset
17 Sun gear
18 Carrier
19 Ring gear
20 Planetary gearwheel
21 Planetary gear stage/planetary gearset
22 Sun gear
23 Carrier
24 Ring gear
25 Planetary gearwheel
26 Downstream transmission
27 Shaft
28 Shaft
29 Planetary gear stage/planetary gearset
30 Sun gear
31 Carrier
32 Ring gear
33 Planetary gearwheel
34 Planetary gear stage/planetary gearset
35 Sun gear
36 Carrier
37 Ring gear
38 Planetary gearwheel
B1 Shifting element
B2, B2', B2" Shifting element
K1 Shifting element
K2 Shifting element
K3, K3' Shifting element
K4 Shifting element
R Shifting element
H Shifting element
L Shifting element

The invention claimed is:

1. A motor vehicle transmission comprising:
at least one housing,
a main transmission, and
the main transmission at least comprising:
a drive input side shaft on a drive input side of the main transmission and a drive output side shaft on a drive output side of the main transmission;
a first planetary gearset having a sun gear, a carrier, a planetary gearwheel mounted on the carrier and a ring gear;
a second planetary gearset having a sun gear permanently coupled to the drive-input-side shaft, a carrier permanently coupled to the drive-output-side shaft, a planetary gearwheel mounted on the carrier and a ring gear;
a third planetary gearset having a sun gear, a carrier, a planetary gearwheel mounted on the carrier and a ring gear;
a fourth planetary gearset having a sun gear, a carrier, a planetary gearwheel mounted on the carrier and a ring gear;

the carrier of the second planetary gearset being permanently coupled to the carrier of the fourth planetary gearset;
the ring gear of the second planetary gearset being permanently coupled to the ring gear of the third planetary gearset;
the carrier of the fourth planetary gearset being connectable to the sun gear of the third planetary gearset by a first shifting element;
the carrier of the third planetary gearset being connectable to the housing by a second shifting element; and
the sun gear of the third planetary gearset being connectable to the drive-input-side shaft by a third shifting element and a fourth shifting element.

2. The motor vehicle transmission according to claim 1, wherein a fifth shifting element is connected either:
between the carrier of the third planetary gearset and the ring gear of the fourth planetary gearset, or
between the sun gear of the fourth planetary gearset and the fourth shifting element and the third shifting element.

3. The motor vehicle transmission according to claim 2, wherein
when the fifth shifting element is connected between the carrier of the third planetary gearset and the ring gear of the fourth planetary gearset, the sun gear of the fourth planetary gearset is connectable, via the fourth shifting element, to the drive-input-side shaft and is connectable, via the third shifting element, to the sun gear of the third planetary gearset ; and
when the fifth shifting element is connected between the sun gear of the fourth planetary gearset and the fourth shifting element and the third shifting element, the carrier of the third planetary gearset and the ring gear of the fourth planetary gearset are permanently coupled to one another.

4. The motor vehicle transmission according to claim 1, wherein a sixth shifting element is connected between one of:
the sun gear of the first planetary gearset and the housing,
the carrier of the first planetary gearset and the carrier of the third planetary gearset, and
the ring gear of the first planetary gearset and the fourth shifting element and the third shifting element.

5. The motor vehicle transmission according to claim 4, wherein:
when the sixth shifting element is connected between the sun gear of the first planetary gearset and the housing, the carrier of the first planetary gearset and the carrier of the third planetary gearset are permanently coupled and the ring gear of the first planetary gearset is connectable, via the fourth shifting element, to the drive-input-side shaft, and, via the third shifting element, to the sun gear of the third planetary gearset;
when the sixth shifting element is connected between the ring gear of the first planetary gearset and the fourth shifting element and between the ring gear of the first planetary gearset and the third shifting element, the carrier of the first planetary gearset and the carrier of the third planetary gearset are permanently coupled, and the sun gear of the first planetary gearset is permanently coupled to the housing;
when the sixth shifting element is connected between the carrier of the first planetary gearset and the carrier of the third planetary gearset, the ring gear of the first planetary gearset is connectable, via the fourth shifting element, to the drive-input-side shaft 4, and, via the third shifting element, to the sun gear of the third planetary gearset, and the sun gear of the first planetary gearset is permanently coupled to the housing.

6. The motor vehicle transmission according to claim 1, wherein:
the first planetary gearset is positioned at a drive-input-side end of the main transmission;
the second planetary gearset is positioned at a drive-output-side end of the main transmission;
the third planetary gearset is positioned between the first planetary gearset and the second planetary gearset, adjacent the first planetary gearset; and
the fourth planetary gearset is positioned between the first planetary gearset and the second planetary gearset, adjacent to the second planetary gearset.

7. The motor vehicle transmission according to claim 1, wherein the second shifting element and the third shifting element of the main transmission are interlocking shifting elements, and the first and the fourth shifting elements of the main transmission are frictional shifting elements.

8. The motor vehicle transmission according to claim 1, wherein the drive-output-side shaft of the main transmission engages with a drive-input-side shaft of a downstream transmission that is connected downstream from the main transmission, and the downstream transmission comprises a fifth planetary gearset with a carrier, a carrier, a planetary gearwheel mounted on the carrier and a ring gear, and a sixth planetary gearset with a sun gear, a carrier, a planetary gearwheel mounted on the carrier and a ring gear.

9. The motor vehicle transmission according to claim 8, wherein
the sun gear of the fifth planetary gearset is permanently coupled to the drive-input-side shaft of the downstream transmission and to the drive-output-side shaft of the main transmission;
the carrier of the sixth planetary gearset is permanently coupled to a drive-output-side shaft of the downstream transmission;
the ring gear of the fifth planetary gearset is permanently coupled to the sun gear of the sixth planetary gearset; and
the carrier of the fifth planetary gearset is permanently coupled to the ring gear of the sixth planetary gearset.

10. The motor vehicle transmission according to claim 9, wherein the carrier of the fifth planetary gearset and the ring gear of the fifth planetary gearset are connectable either to the housing or to one another, depending on shifting elements in the downstream transmission.

11. The motor vehicle transmission according to claim 9, wherein depending on a shifting element in the downstream transmission, the carrier of the fifth planetary gearset is connectable to the housing, and depending on further shifting elements, the sun gear of the sixth planetary gearset is connectable either to the housing or to the carrier of the sixth planetary gearset.

* * * * *